(12) United States Patent
Goettker

(10) Patent No.: US 6,447,073 B1
(45) Date of Patent: Sep. 10, 2002

(54) TORSION AXLE HAVING A SELECTIVELY REPLACEABLE INSERT ASSEMBLY

(76) Inventor: Bernhardt P. Goettker, 14195 Ridge Canyon Rd., Valley Center, CA (US) 92082

( * ) Notice: Subject to any disclaimer, the term of this patent is extended or adjusted under 35 U.S.C. 154(b) by 0 days.

(21) Appl. No.: 09/847,627

(22) Filed: May 2, 2001

(51) Int. Cl.[7] .............................................. B60B 35/00
(52) U.S. Cl. ...................................... 301/127; 267/276
(58) Field of Search .............................. 301/124.1, 126, 301/127, 131, 132, 134; 267/276, 279

(56) References Cited

U.S. PATENT DOCUMENTS

| | | | |
|---|---|---|---|
| 2,779,602 A | | 1/1957 | Kimbro et al. ............... 280/43 |
| 3,096,085 A | | 7/1963 | Owens ........................ 267/57 |
| 3,298,711 A | | 1/1967 | Hickman .................... 280/124 |
| 3,615,081 A | | 10/1971 | Ravenel ....................... 267/57 |
| 4,473,238 A | | 9/1984 | Antoine ...................... 280/723 |
| 4,491,342 A | | 1/1985 | Aubry ........................ 280/700 |
| 4,723,790 A | | 2/1988 | Wharton ..................... 280/700 |
| 4,951,962 A | * | 8/1990 | Tomida et al. .............. 301/127 |
| 4,991,872 A | | 2/1991 | Richardson ................. 280/788 |
| 5,158,321 A | | 10/1992 | Maul .......................... 280/700 |
| 5,163,701 A | | 11/1992 | Cromley, Jr. ............... 280/700 |
| 5,277,450 A | | 1/1994 | Henschen ................... 280/717 |
| 5,326,128 A | | 7/1994 | Cromley, Jr. ............... 280/656 |
| 5,411,286 A | * | 5/1995 | Pittman ...................... 301/127 |
| 5,411,287 A | | 5/1995 | Henschen ................... 280/717 |
| 6,070,898 A | | 6/2000 | Dickie et al. ............ 280/304.1 |
| 6,299,259 B1 | * | 10/2001 | MacKarvich ............... 301/127 |
| 6,340,165 B1 | * | 1/2002 | Kelderman .......... 280/124.153 |

FOREIGN PATENT DOCUMENTS

FR      2618733 A   *   7/1987 ................. 301/127

OTHER PUBLICATIONS

Henschen Dure–Flex Rubber Torsion Axles, The Inside Perspective, Henschen, 1997.

Flexiride Cartridge Rubber Torsion Axles, Universal Group, 1997.

\* cited by examiner

*Primary Examiner*—S. Joseph Morano
*Assistant Examiner*—Long Bao Nguyen
(74) *Attorney, Agent, or Firm*—Rodney F. Brown

(57) ABSTRACT

A torsion axle is provided, which includes an axle tube having an interior chamber and an insert assembly positioned within the interior chamber. The insert assembly includes a rigid shaft, a relatively flexible cartridge, and relatively inflexible front and rear bushings. The cartridge has an interior passageway receiving the shaft and the front and rear bushings likewise each have an aperture receiving the shaft. The front bushing is positioned on the shaft in front of the cartridge, while the rear bushing is positioned on the shaft to the rear of the cartridge. The front and rear bushings are dimensioned to fit closely within the interior chamber and are freely rotatable relative to the shaft, while the cartridge is non-rotatable relative to the shaft at the interior passageway. The front and rear bushings provide means for absorbing the vertical load on the insert assembly to the exclusion of the cartridge, while the cartridge provides means for absorbing the torsional load on the insert assembly to the exclusion of the front and rear bushings. The torsion axle also has a selectively removable cap positioned over the front end of the interior chamber, which enables selective removal of the insert assembly from the interior chamber. A method is provided for selectively adjusting the torsion load rating of the torsion axle by removing one insert assembly and replacing it with another having a different torsion load rating.

26 Claims, 5 Drawing Sheets

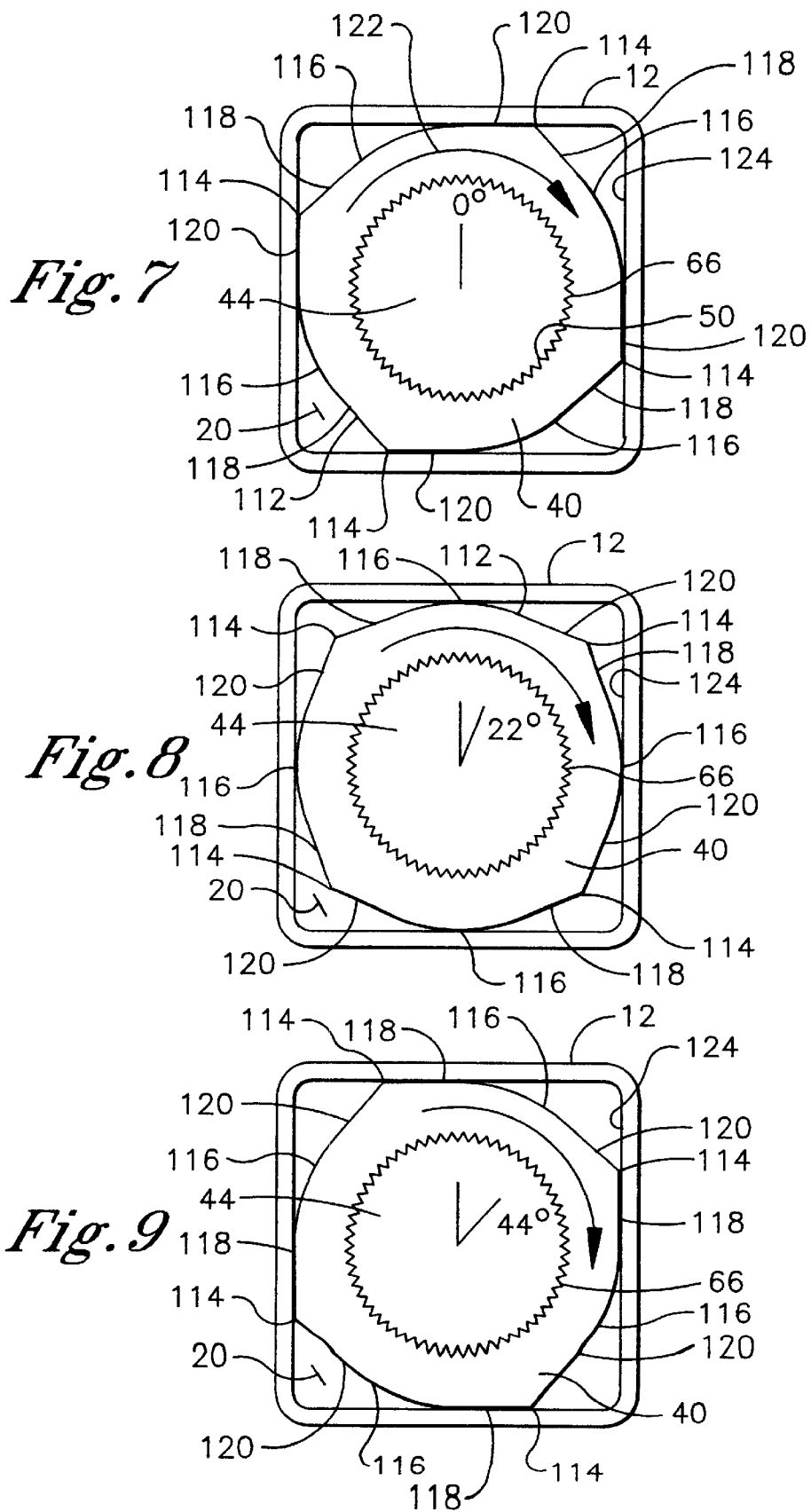

TORSION AXLE HAVING A SELECTIVELY REPLACEABLE INSERT ASSEMBLY

TECHNICAL FIELD

The present invention relates generally to axles for wheeled vehicles and, more particularly, to a torsion axle having a selectively replaceable insert assembly.

BACKGROUND OF THE INVENTION

Axles for wheeled vehicles employing torsion spring suspensions have been developed as a desirable alternative to axles employing leaf spring suspensions. When the wheels for a vehicle having a torsion axle move up and down in response to variability in the surface of the roadway, the torsion axle translates the vertical motion of the wheel to torsion forces and transmits the torsion forces to a torsion spring, which effectively dampens the torsion forces. Torsion axles commonly utilize a rubber cartridge as the torsion spring. Rubber is particularly advantageous for this purpose because it elastically deforms in a predictable manner in response to the torsion forces, thereby absorbing the torsional stress to the torsion axle.

Torsion axles enable independent suspension of the wheels, which, as a rule, provides improved handling, a smoother ride, and a lower center of gravity than their counterparts employing leaf spring suspensions. However, torsion axles are also often more costly because torsion axles are relatively more complex, having specialized parts which are costly to manufacture and maintain. For example, the rubber cartridges used as torsion springs employ large amounts of high-density rubber, which is costly to provide. The high-density rubber is also heavy, which renders the cartridges costly to transport to market and can undesirably make a significant contribution to the weight of the resulting vehicle. As such, the present invention recognizes a need for a more cost-effective reduced-weight torsion axle, which maintains a high level of performance.

Accordingly, it is an object of the present invention to provide a torsion axle having a reduction in material requirements for manufacture and a corresponding reduction in weight. It is another object of the present invention to provide a torsion axle, which the practitioner is able to tailor during assembly to the specific torsion loading requirements for a particular application of the torsion axle. It is a further object of the present invention to provide a torsion axle, which the practitioner is readily able to modify in the field to change its torsion loading limits. It is still a further object of the present invention to provide a torsion axle, from which the practitioner is readily able to change out worn components in the field. It is yet a further object of the present invention to provide a torsion axle, which maintains a satisfactory performance level despite wear.

These objects and others are accomplished in accordance with the invention described hereafter.

SUMMARY OF THE INVENTION

The present invention is a torsion axle comprising an axle tube having an interior chamber and an insert assembly positioned within the interior chamber. The insert assembly comprises a shaft, a cartridge and front and rear bushings. The shaft is substantially rigid and has a front tip and a rear tip. The cartridge is relatively flexible and has an interior passageway receiving the shaft. The front and rear bushings are relatively inflexible and each have an aperture receiving the shaft. The front bushing is positioned on the shaft between the front tip and the cartridge, while the rear bushing is positioned on the shaft between the rear tip and the cartridge. The front and rear bushings are dimensioned to fit closely within the interior chamber and are freely rotatable relative to the shaft, while the cartridge is substantially non-rotatable relative to the shaft at the interior passageway. The front and rear bushings provide means for substantially absorbing the vertical load on the insert assembly to the exclusion of the cartridge, while the cartridge provides means for absorbing the torsion load on the insert assembly to the exclusion of the front and rear bushings. The cartridge has a taper between the front and rear bushing to provide a fluid seal in the interior chamber between the cartridge and the axle tube proximal to the front bushing. In accordance with one embodiment, the front and rear bushings engage opposite front and rear faces of the cartridge, respectively. In accordance with another embodiment, the front bushing engages the front face of the cartridge, while a substantial space is provided between the rear bushing and the opposite rear face of the cartridge to accommodate different length cartridges on the same length shaft.

The torsion axle further comprises a cap having a face, sides and selectively removable retention means. The face is positioned over the interior chamber between the front tip and the front bushing. The sides are contiguous with the face, but are oriented substantially perpendicular to the face overlapping the axle tube. The retention means enable selective removal of the cap from over the interior chamber and selective removal of the insert assembly from within the interior chamber. The retention means is preferably a threaded member or a limited strength knock-off weld. The insert assembly further comprises means positioned around the shaft for limiting rotation of the shaft relative to the axle tube. The rotation limiting means is a disk having an irregularly shaped outside edge. The outside edge has at least one corner with a trailing and leading face forming a rotation stop and at least one connecting segment with a curved face.

The present invention is further a method for selectively adjusting the torsion load rating of a torsion axle having an axle tube with an interior chamber. The method comprises removing a first insert assembly from the interior chamber and replacing the first insert assembly in the interior chamber with a second insert assembly. The first length of the first cartridge comprising the first insert assembly is substantially different than the second length of the second cartridge comprising the second insert assembly, while the first and second shafts of the first and second insert assemblies, respectively, have substantially the same fixed length. Consequently, the first and second insert assemblies have different load ratings. When the first length of the first cartridge is longer than the second length of the second cartridge, the first insert assembly has a higher the torsion load rating than the second insert assembly. Conversely, when the second length of the second cartridge is longer than the first length of the first cartridge, the second insert assembly has a higher the torsion load rating than the first insert assembly.

The present invention will be further understood from the drawings and the following detailed description.

BRIEF DESCRIPTION OF THE DRAWINGS

FIG. 7 is an end view of the insert assembly shown in FIG. 2, wherein the rotation limiter is at an unloaded minimum rotation position.

FIG. 8 is an end view of the insert assembly shown in FIG. 2, wherein the rotation limiter is at a mid-rotation position.

FIG. 9 is an end view of the insert assembly shown in FIG. 2, wherein the rotation limiter is at a maximum rotation position.

DESCRIPTION OF PREFERRED EMBODIMENTS

Figure 1:
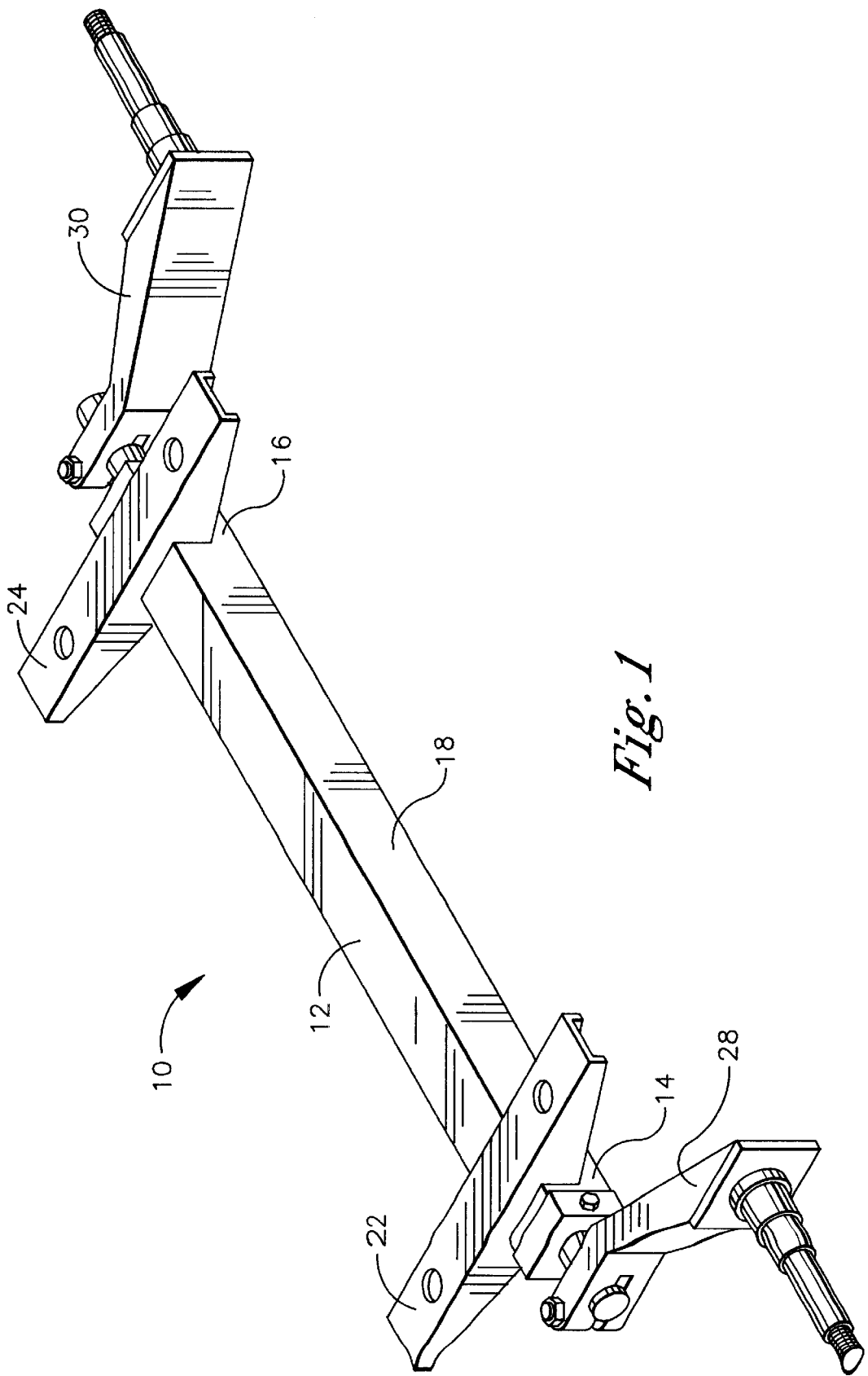
FIG. 1 is a perspective view of a torsion axle of the present invention.

Referring initially to FIG. 1, a torsion axle of the present invention is shown and generally designated 10. The torsion axle 10 is sized and configured for mounting to a wheeled vehicle (not shown) in a manner well known to the skilled artisan. Although the torsion axle 10 has general application to substantially any wheeled vehicle, the torsion axle 10 has particular application to trailers. The torsion axle 10 is adaptable as described hereafter to supporting a broad range of weight loads, weight distributions and shapes.

Figure 2:
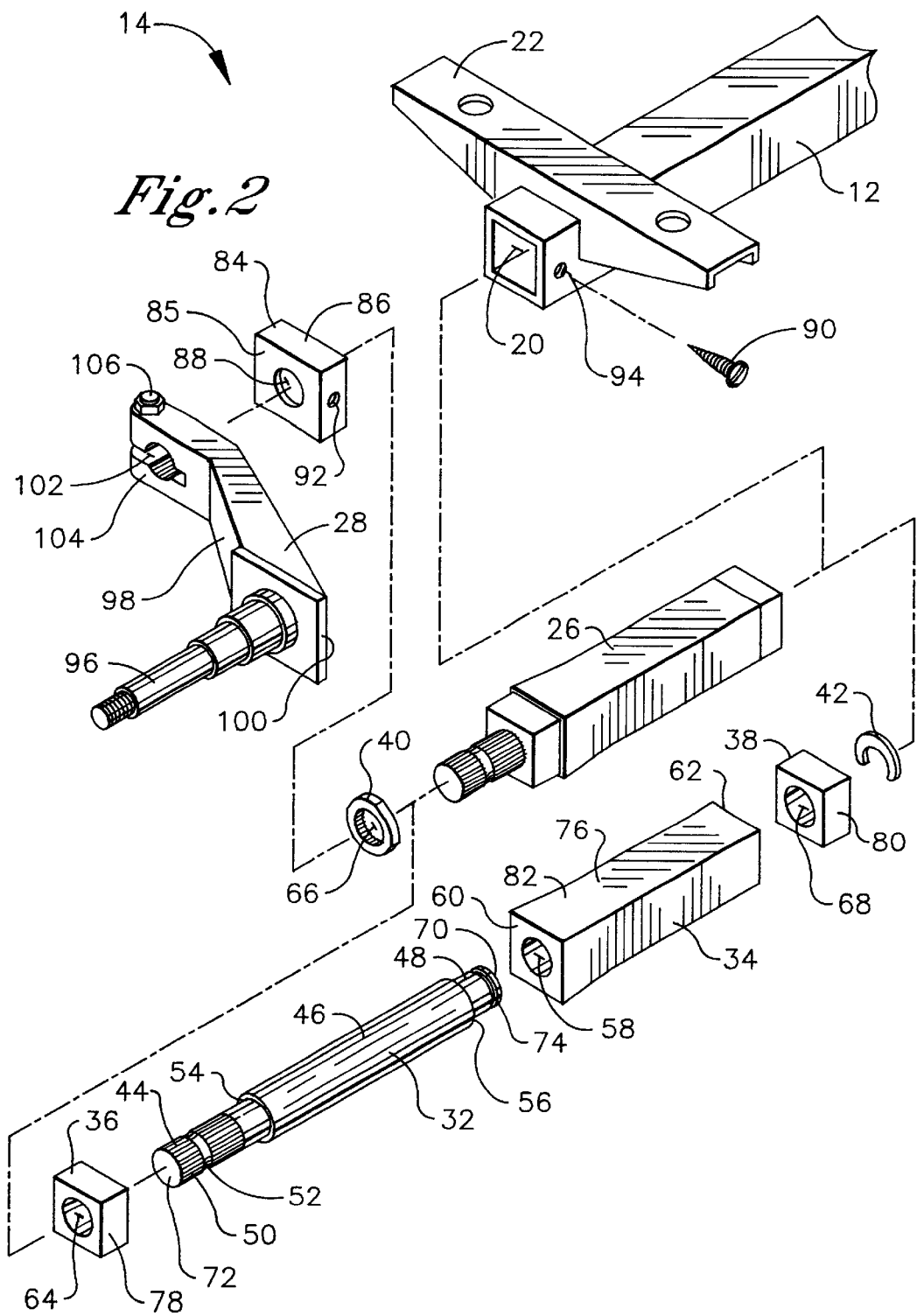
FIG. 2 is an exploded perspective view of one end of the torsion axle shown in FIG. 1.

The torsion axle comprises an axle tube 12, which has an at least somewhat rigid tubular construction formed from a high strength material such as steel. The axle tube 12 has a continuous length, which may be characterized by a first end section 14, a second end section 16, and a central section 18 extending between the first and second end sections 14, 16. Referring additionally to FIG. 2, an interior chamber 20 runs the length of the axle tube 12, which is shown in the present embodiment to have the cross sectional configuration of a square. However, it is within the scope of the present invention to alternately configure the cross section of the interior chamber 20 in substantially any non-circular shape. For example, the cross section of the interior chamber 20 may have a non-circular rounded configuration, such as an oval or ellipse. Alternatively the cross section of the interior chamber 20 may have a non-circular configuration defining at least one corner, preferably having an interior angle of 90° or less, such as a rectangle or triangle. The first and second end sections 14, 16 are in substantially straight alignment with the central section 18. Although not shown, the central section may alternately have an arcuate configuration dipping below the first and second end sections in a manner which corresponds to the configuration of a boat hull for boat trailer applications. A first bracket 22 is affixed to the first end section 14 and a second bracket 24 is similarly affixed to the second end section 16, which enable mounting of the torsion axle 10 to the associated wheeled vehicle.

Figure 3:
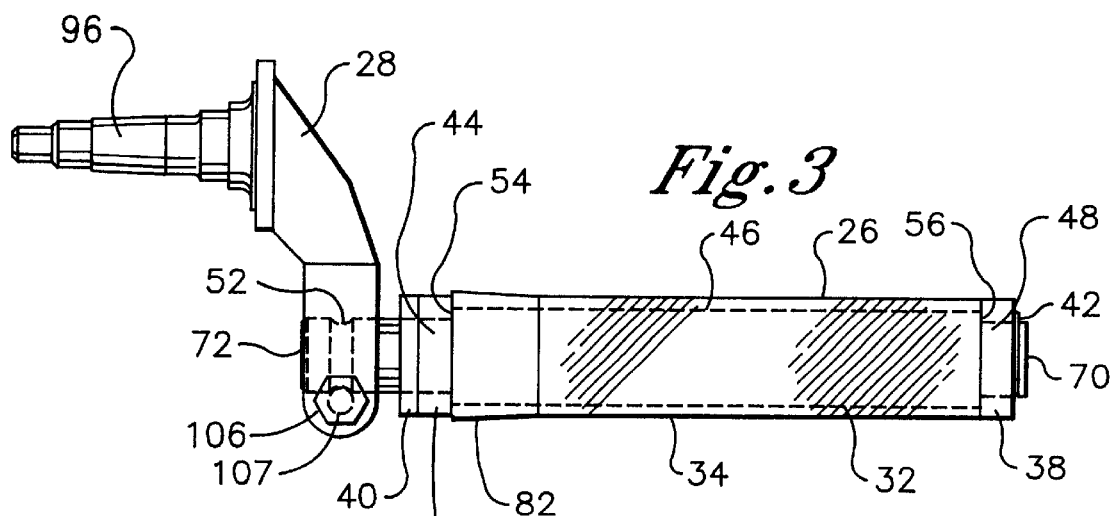
FIG. 3 is a bottom view of the insert assembly and associated wheel mount assembly shown in FIG. 2.

The torsion axle 10 further comprises a first insert assembly 26 and a first wheel mount assembly 28 positioned at the first end section 14. A second insert assembly (not visible) and a second wheel mount assembly 30 are similarly positioned at the second end section 16, which are substantially identical to the first insert and wheel mount assemblies 26, 28. Accordingly, the following description of the first insert and wheel mount assemblies 26, 28, referring specifically to FIGS. 2 and 3. applies equally to the second insert and wheel mount assemblies.

The first insert assembly 28 comprises a shaft 32, a cartridge 34, a front bushing 36, a rear bushing 38, an optional rotation limiter 40, and a rear bushing retention clip 42. The shaft 32 is a substantially rigid cylindrical rod, which has a solid construction formed from a high strength material such as steel. The shaft 32 has a predetermined fixed length typically on the order of about 1 to 2 feet. The shaft 32 is characterized by a front portion 44, a middle portion 46 and a rear portion 48. The front portion 44 has a plurality of longitudinal splines 50 and a circumferential groove 52 formed on its surface, which function in a manner described below. The middle portion 46 is slightly raised (i.e., has a greater diameter) relative to the front and rear portions 44, 48, thereby defining a front shoulder 54 between the front and middle portions 44, 46 and defining a rear shoulder 56 between the middle and rear portions 46, 48.

The cartridge 34 is an elongated block, which is formed from a relatively flexible compressible material. In general, the material of the cartridge 34 is one which enables the cartridge 34 to function as a torsion spring for the torsion axle 10. As such, the material of the cartridge 34 may be synthetic or natural and is preferably characterized as an elastomeric material, such as a high-density, high-durometer solid rubber or the like. The cartridge 34 has an interior passageway 58 extending the length of the cartridge 34, which receives substantially the entire middle portion 46 of the shaft 32. The front portion 44 of the shaft 32 protrudes from the interior passageway 58 at a front face 60 of the cartridge 34 and the rear portion 48 of the shaft 32 protrudes from the interior passageway 58 at a rear face 62 of the cartridge 34. In accordance with a preferred embodiment, the interior passageway 58 is formed by molding the cartridge 34 around the entire middle portion 46. The surface of the interior passageway 58 is bonded to the surface of the middle portion 46 by covering the middle portion 46 with an adhesive prior to molding the cartridge 34 thereon. As a result, the shaft 32 and cartridge 34 are not substantially rotatable relative to one another at their interface. In comparison with the cartridge 34, the front bushing 36 is a relatively short block, which is formed from a relatively inflexible incompressible material such as a rigid plastic or metal. The front bushing 36 fits around the protruding front portion 44 and is positioned immediately adjacent to and in engagement with the front face 60 of the cartridge 34 and the front shoulder 54 of the shaft 32. The front portion 44 passes through an aperture 64 in the front bushing 36, which has a diameter slightly larger than the outside diameter of the front portion 44 such that the front portion 44 and front bushing 36 are substantially rotatable relative to one another at their interface.

The optional rotation limiter 40 is a thickened disk having a splined aperture 66 therethrough. The rotation limiter 40 has an asymmetrical profile and is formed from a rigid high strength material such as steel. If the rotation limiter 40 is present, the front portion 44 passes through the aperture 66 in the rotation limiter 40 and the remainder of the front portion 44 extends forwardly from the aperture 66. The rotation limiter 40 is positioned within the interior chamber 20 immediately adjacent to and in engagement with the front bushing 36. The splines 50 of the front portion 44 engage the splined aperture 66 so that the shaft 32 and rotation limiter 40 are not substantially rotatable relative to one another.

The rear bushing 38 is constructed substantially identically to the front bushing 36, similarly fitting around the protruding rear portion 48 and positioned immediately adjacent to and in engagement with the rear face 62 of the cartridge 34 and the rear shoulder 56 of the shaft 32. The rear portion 48 passes through an aperture 68 in the rear bushing 38, which has a diameter slightly larger than the outside diameter of the rear portion 48 such that the rear portion 48 and rear bushing 38 are substantially rotatable relative to one another at their interface. The remainder of the rear portion 48 protrudes rearwardly from the aperture 68 and is substantially shorter than remainder of the front portion 44 protruding from the aperture 64 such that the rear bushing 38 is positioned more proximal to the rear tip 70 than is the front bushing 36 to the front tip 72. The rear bushing 38 is maintained in this position by the horseshoe-shaped rear bushing retention clip 42, which is press fitted into a clip receptor groove 74 formed in the rear portion 48 between the rear bushing 38 and the rear tip 70.

Figure 4:
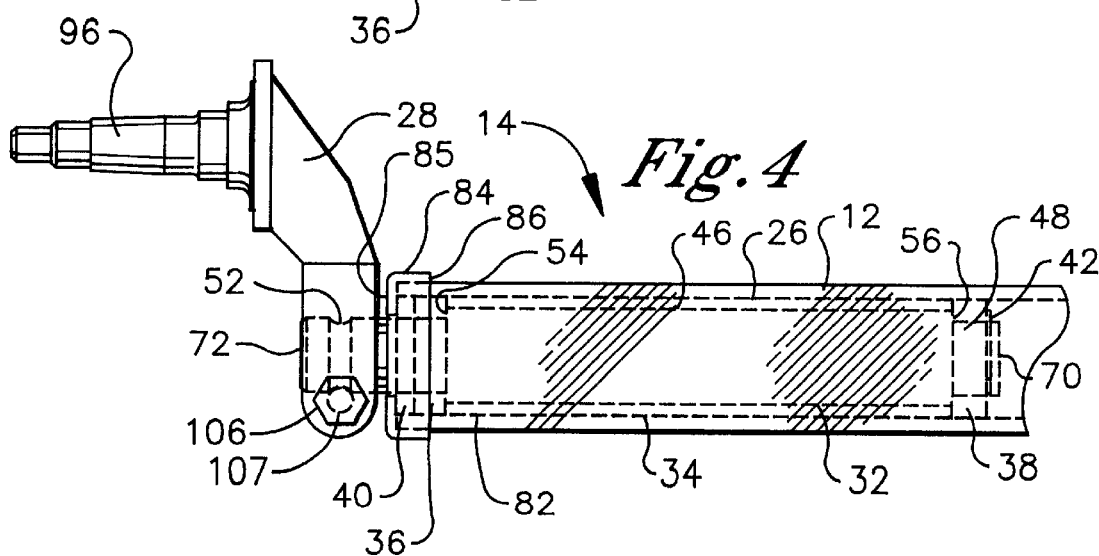
FIG. 4 is a bottom view of the end of the torsion axle shown in FIG. 2.

The cartridge 34, front bushing 36, and rear bushing 38 each have external surfaces 76, 78, 80, respectively, which are shaped in correspondence with the interior chamber 20. Accordingly, the external surfaces 76, 78, 80 of the present embodiment define substantially square cross sections in correspondence with the square cross section of the interior chamber 20. Since the flexible material of the cartridge 34 is relatively compressible in comparison with the inflexible material of the front and rear bushings 36, 38, the external surface 76 of the cartridge 34 is dimensioned about the same as, or slightly larger than, the cross section of the interior chamber 20, whereas the external surfaces 78, 80 of the front and rear bushings 36, 38 are dimensioned slightly smaller than the cross section of the interior chamber 20. Referring additionally to FIG. 4, the relative dimensions of the external surfaces 76, 78, 80 and interior chamber 20 enable the practitioner to press the first insert assembly 26 into the interior chamber 20 of the first end section 14 such that the cartridge 34, front bushing 36, and rear bushing 38 are in close fitting relationship with the axle tube 12.

To insure a tight fit between the axle tube 12 and the cartridge 34 within the internal chamber 20, a forward length 82 of the external surface 76 adjacent to the front face 60 is slightly uniformly expanded at the front face 60. The forward length 82 tapers away from the front face 60, while the remainder of the cartridge 34 has a substantially uniform cross section. Once pressed into the first end section 14, the uniformly expanded forward length 82 provides a fluid-tight seal against the passage of water or other fluids into the interior chamber 20 behind the first insert assembly 26. This is a particularly advantageous feature for boat trailer applications when the torsion axle 10 is frequently submerged in water.

The torsion axle 12 further comprises a selectively removable cap 84 having a face 85 sized in substantial correspondence with the cross section of the interior chamber 20 and having sides 86, which are contiguous with the face 85, but are oriented substantially perpendicular to the face 85. The cap 84 substantially prevents unintentional migration of the first insert assembly 26 from the interior chamber 20 out the first end section 14 while structurally reinforcing the first end section 14.

The cap 84 is placed on the first end section 14 between the front tip 72 and the front bushing 36 with the face 85 positioned over the interior chamber 20. The front portion 44 of the shaft 32 passes through an aperture 88 in the face 85 having a diameter slightly larger than the outside diameter of the front portion 44 such that the cap 84 does not substantially impede rotation of the shaft 32. The sides 86 of the cap 84 overlap the first end section 14 of the axle tube 12 to maintain placement of the cap 84 in cooperation with retention means such as a selectively removable self-threading bolt 90 and corresponding holes 92, 94 in the sides 86 and first end section 14, respectively. The practitioner selectively removes the cap 84 from the first end section 14 by withdrawing the bolt 90 from the hole 94 and sliding the cap 84 forward over the front portion 44. To replace the cap 84, the practitioner returns the cap 84 over the first end section 14 and reinserts the bolt 90 into the hole 94. In an alternate embodiment not shown, one or more limited strength knock-off welds between the sides 86 and the first end section 14 are substituted for the bolt 90 and holes 92, 94 as retention means. The practitioner selectively removes the cap 84 from the first end section 14 by manually striking the limited strength knock-off welds with a hammer, chisel or the like to break the welds and knock off the cap 84. To replace the cap 84, the practitioner returns the cap 84 over the first end section 14 and rewelds the cap 84 to the first end section 14 with the limited strength knock-off welds.

The first wheel mount assembly 28 comprises a spindle 96 and a torsion arm 98. The spindle 96 is fixably attached to a first end 100 of the torsion arm 98. The axis of the spindle 96 is in substantial perpendicular alignment with the axis of the torsion arm 98 and in substantially parallel alignment with the axis of the first insert assembly 26 and first end section 14. The spindle 96 provides a structure for rotatable mounting of a wheel (not shown) to the first wheel mount assembly 28 in a manner well known to the skilled artisan. A shaped slot 102 having splined sides is formed in a second end 104 of the torsion arm 98. The shaped slot 102 is sized and configured to receive the remainder of the front portion 44 and an arm retention set 106 comprising a nut, bolt and washer set is provided to retain the front portion 44 in the shaped slot 102. Specifically, the front portion 44 slides into the shaped slot 102 and the bolt of the arm retention set 106 fits into a hole 107 running through the second end 104 adjacent to the shaped slot 102, while simultaneously engaging the circumferential groove 52. When the nut of the arm retention set 106 is tightened onto the bolt, the shaped slot 102 is compressed against the front portion 44 and the splines 50 on the front portion 44 grip the corresponding splined sides of the shaped slot 102, thereby removably attaching the first wheel mount assembly 28 to the shaft 32. Even if the nut loosens somewhat, engagement of the bolt with the circumferential groove 52 prevents the first wheel mount assembly 28 from slipping off the shaft 32.

When the torsion axle 10 is operating in a load bearing manner, the first wheel mount assembly 28 transfers substantially the entirety of the vertical load from the wheel of the vehicle, to which the torsion axle 10 is mounted, to the front and rear bushings 36, 38 via the shaft 32. Since the front and rear bushings 36, 38 are relatively incompressible, they prevent substantial compression of the cartridge 34 along the vertical axis, which would otherwise diminish the effectiveness of the cartridge for its intended function and cause undue wear on the cartridge 34. The function of the cartridge 34 is to absorb torsion loads, which the first wheel mount assembly 28 transfers to it via the shaft 32. The cartridge 34 performs this function by permitting limited rotation of the shaft 32 within the interior chamber 20 as a function of the degree of torsion force applied to the shaft 32 by the first wheel mount assembly 28 and the elastic deformability of the cartridge material. The torsion load bearing performance of the cartridge 34 is enhanced by the ability of the front and rear bushings 36, 38 to bear substantially all of the vertical load on the first wheel mount assembly 28 to the exclusion of the cartridge 34.

Figure 5:
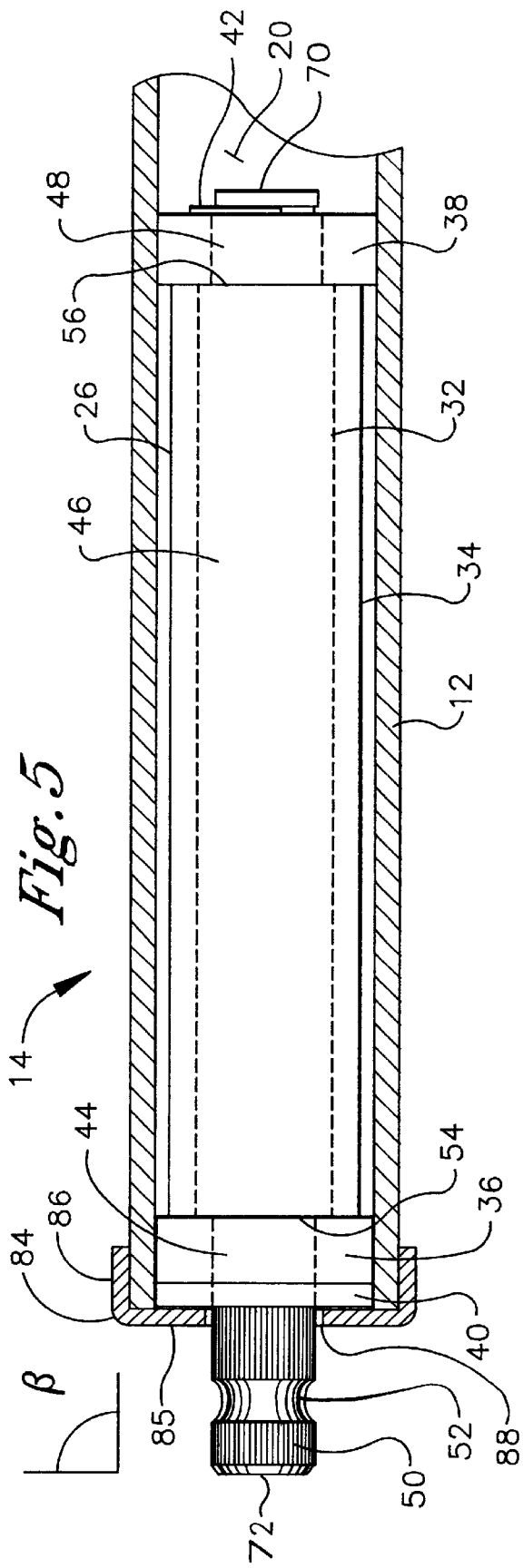
FIG. 5 is a side view of a partially worn insert assembly of the torsion axle of the present invention positioned within the axle tube.
Figure 6:
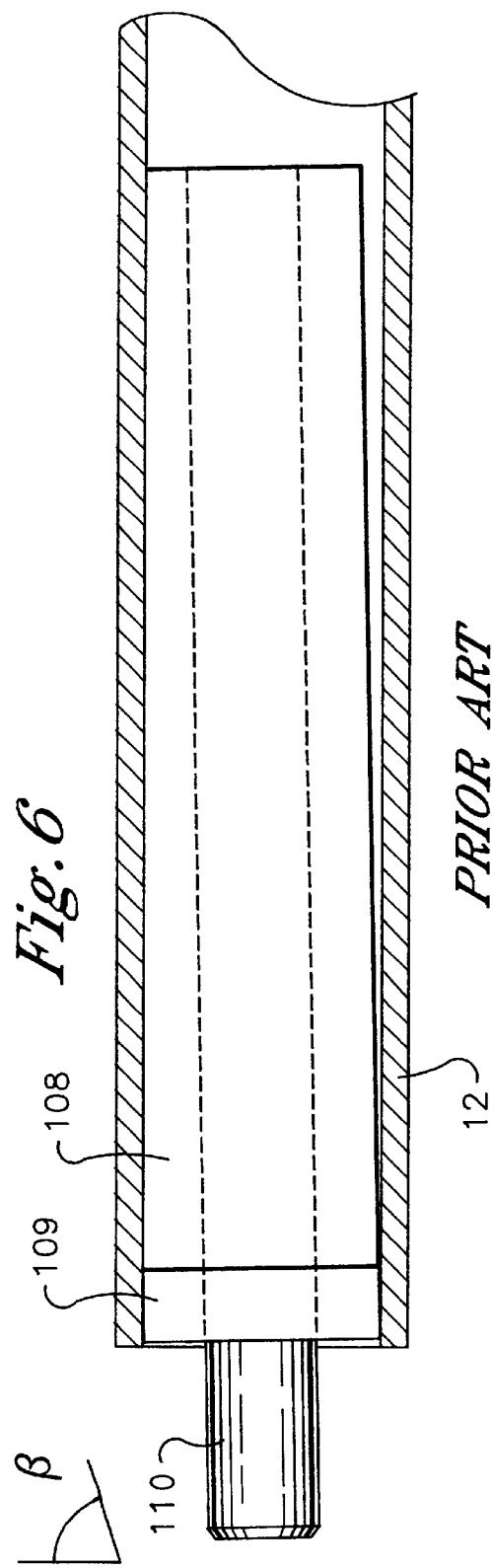
FIG. 6 is a side view of a partially worn insert assembly of a prior art torsion axle positioned within an axle tube.

Although the present invention reduces compression wear on the cartridge 34, some degree of compression wear is inevitable over an extended time period. Referring to FIG. 5, a partially worn cartridge 34 is shown positioned in the first end section 14. It is apparent that the front and rear bushings 36, 38 promote uniform compression wear along the entire length of the cartridge 34. As a result, the angle of the longitudinal axis of the shaft 32 to vertical β is maintained substantially constant, typically at about 90°, as the cartridge 34 wears. This result also advantageously maintains proper tire camber for the associated wheeled vehicle. By comparison, corresponding compression wear is shown on a conventional prior art cartridge 108 in FIG. 6, which lacks a rear bushing, but has a front bushing 109. Compression wear along the length of the cartridge 108 is non-uniform, with wear being greater at the rear end of the cartridge 108 due to the absence of the rear bushing. As a result, the angle of the longitudinal axis of the shaft 110 to vertical β decreases as the cartridge 34 wears. This result undesirably produces improper tire camber for the associated wheeled vehicle.

Referring to FIGS. 2 and 7–9, the rotation limiter 40 is shown as an optional means for reducing compression wear on the cartridge 34 and preventing undue stress on the cartridge 34 during an overload condition by limiting rotation of the shaft 32 within the first end section 14. The outside edge 112 of the rotation limiter 40 is irregularly shaped to provide a plurality of rotation stops 114 spaced around the outside edge 112. The remainder of the outside edge 112 between the rotation stops 114 comprises connecting segments 116. The rotation stops 114 are corners, each having a leading face 118 and a trailing face 120 on opposing sides of the corner, which preferably has an interior angle of greater than 90°. The rotation stops 114 prevent further rotation of the shaft 32 in a given direction (for example, clockwise as indicated by the directional arrow 122) when the leading faces 118 of the rotation stops 114 engage the sides 124 of the interior chamber 20. It is further noted that the rotation stops 114 prevent further rotation of the shaft 32 in the opposite direction when the trailing faces 120 of the rotation stops 114 engage the sides 124 of the interior chamber 20. In contrast, the curved faces of the connecting segments 116 permit rotation of the shaft 32, even when the connecting segments 116 engage the sides 124 of the interior chamber 20, until the leading or trailing faces 118, 120 of the rotation stops 114 engage the sides 124 of the interior chamber 20.

FIGS. 7–9 show operation of the rotation limiter 40, which limits rotation of the shaft 32 to a rotation range between a minimum of 0° and a maximum of 44°. In FIG. 7, the rotation limiter 40 is at an unloaded minimum rotation position of 0°. The trailing faces 120 of the rotation stops 114 engage the sides 124 of the interior chamber 20, preventing further rotation of the shaft 32 in the counterclockwise direction, while the curved faces of the connecting segments 116 permit rotation of the shaft 32 in the clockwise direction 122. In FIG. 8, the rotation limiter 40 is at a mid-rotation position of 22°. Only the curved faces of the connecting segments 116 engage the sides 124 of the interior chamber 20, which permits rotation of the shaft 32 in either the clockwise 122 or counterclockwise direction. In FIG. 9, the rotation limiter 40 is at a maximum rotation position of 440. The leading faces 118 of the rotation stops 114 engage the sides 124 of the interior chamber 20, preventing further rotation of the shaft 32 in the clockwise direction 122, while the curved faces of the connecting segments 116 permit rotation of the shaft 32 in the counterclockwise direction. It is understood that the above-recited rotation range of the particular rotation limiter 40 shown herein is merely exemplary. It is within the purview of the skilled artisan to select alternate rotation limiters in accordance with the present teaching, which have rotation ranges other than disclosed herein and such alternate rotation limiters are within the scope of the present invention. It is further within the scope of the present invention to position the rotation limiter 40 substantially anywhere on the shaft 32 within the interior chamber 20 so long as the rotation limiter 40 is not substantially rotational relative to the shaft 32.

Figure 10:
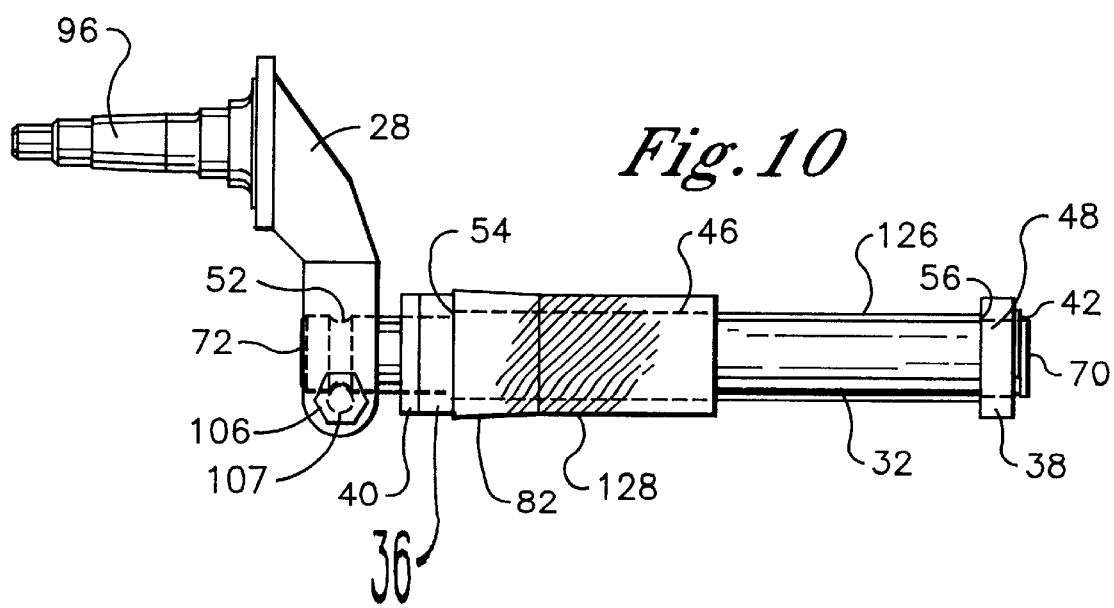
FIG. 10 is a bottom view of an alternate embodiment of an insert assembly and associated wheel mount assembly having utility in a torsion axle of the present invention.

Referring to FIG. 10, an alternate embodiment of an insert assembly is shown and generally designated 126. The alternate insert assembly 126 is substantially the same as the first insert assembly 26 described above except that the alternate insert assembly 126 employs an alternately configured cartridge designated 128. The remaining elements of the insert assembly 126, which are common to the first insert assembly 26, are designated by the same reference characters as shown in FIGS. 1 and 2. The alternate cartridge 128 differs from the cartridge 34 only in its length. As is apparent from FIG. 3, the cartridge 34 has essentially the maximum permissible length for use with the shaft 32, which has a fixed length. The length of the alternate cartridge 128 has been shortened by eliminating the rear half of the cartridge 34. Accordingly, the front face 60 of the alternate cartridge 128 remains positioned immediately adjacent to and in engagement with the front bushing 36, but there is a substantial space between the rear face 62 of the alternate cartridge 128 and the rear bushing 38 because the rear bushing 38 remains retained between the rear shoulder 56 and the rear bushing retention clip 42 proximal to the rear tip 70.

It is apparent that the present configuration of the alternate insert assembly 126 is capable of bearing torsion loads applied to it by the first wheel mount assembly 28 in a like manner as the first insert assembly 26. However, the torsion load rating of the alternate insert assembly 126 is substantially less than that of the first insert assembly 26 because the alternate cartridge 128 contains substantially less load bearing material than the cartridge 34. Accordingly, the alternate insert assembly 126 is typically utilized in place of the first insert assembly 26 when the torsion loading requirements for the particular application of the torsion axle fall below the maximum torsion loading limits of the alternate insert assembly 126.

The advantages of the alternate insert assembly 126 over the first insert assembly 26 for lower torsion load applications are several fold. In particular, the material requirements for manufacture are reduced, while still satisfying the torsion loading requirements of the torsion axle. Consequently the manufacturing cost of the alternate insert assembly 126 is substantially lower than the first insert assembly 26. A reduction in material requirements for manufacture of the alternate insert assembly 126 also reduces the weight of the finished product, which reduces product distribution costs and advantageously reduces the overall weight of the vehicle associated with the alternate insert assembly 126. Finally, the alternate insert assembly 126 desirably produces a softer ride for the associated wheeled vehicle under low torsion loads. The excess load bearing material in the first insert assembly 26 produces too hard a ride for the associated wheeled vehicle under low torsion loads.

In general, the present invention enables the practitioner to tailor the torsion axle to the specific torsion loading requirements for the particular application of the torsion axle in a convenient and cost-effective manner during assembly or during subsequent use of the torsion axle. For example, a number of insert assemblies can be manufactured across an entire range of torsion load ratings simply by altering the length of the cartridges during manufacture while using standard components for the remainder of the insert assemblies. When a torsion axle is assembled, the practitioner can select the insert assembly corresponding to the anticipated performance requirements of the torsion axle from a wide inventory of different insert assemblies. As a result, the torsion axle fully meets its performance requirements. Alternatively, the practitioner can change out the insert assembly for the torsion axle in the field during use if the performance requirements for the torsion axle are not met or vary simply by removing the cap, withdrawing the existing insert assembly, installing the new insert assembly, and replacing the cap. The practitioner can also replace worn insert assemblies in the field by the same procedure.

While the forgoing preferred embodiments of the invention have been described and shown, it is understood that alternatives and modifications, such as those suggested and others, may be made thereto and fall within the scope of the invention.

I claim:

1. A torsion axle comprising:
  an axle tube having an interior chamber; and
  an insert assembly positioned within said interior chamber, wherein said insert assembly comprises,
    a substantially rigid shaft having a front tip and a rear tip,
    a relatively flexible cartridge having an interior passageway receiving said shaft,
    a relatively inflexible front bushing having an aperture receiving said shaft, wherein said front bushing is positioned on said shaft between said front tip and said cartridge, and
    a relatively inflexible rear bushing having an aperture receiving said shaft, wherein said rear bushing is positioned on said shaft between said rear tip and said cartridge.

2. The torsion axle of claim 1, wherein said front bushing engages said cartridge.

3. The torsion axle of claim 1, wherein said rear bushing engages said cartridge.

4. The torsion axle of claim 1, wherein said insert assembly further comprises a substantial space between said rear bushing and said cartridge.

5. The torsion axle of claim 1 further comprising a cap positioned over said interior chamber between said front tip and said front bushing, wherein said cap has a selectively removable retention means to enable selective removal of said cap from over said interior chamber and selective removal of said insert assembly from within said interior chamber.

6. The torsion axle of claim 1, wherein said retention means is a threaded member.

7. The torsion axle of claim 1, wherein said retention means is a limited strength knock-off weld.

8. The torsion axle of claim 1, wherein said front and rear bushings are dimensioned to fit closely within said interior chamber.

9. The torsion axle of claim 1, wherein said front and rear bushings are rotatable relative to said shaft.

10. The torsion axle of claim 1, wherein said cartridge is substantially non-rotatable relative to said shaft at said interior passageway.

11. The torsion axle of claim 1, wherein said cartridge has a taper between said front and rear bushing.

12. The torsion axle of claim 1, wherein said insert assembly further comprises means positioned around said shaft for limiting rotation of said shaft relative to said axle tube.

13. The torsion axle of claim 12, wherein said rotation limiting means is a disk having an irregularly shaped outside edge.

14. The torsion axle of claim 13, wherein said outside edge has at least one corner with a trailing and leading face forming a rotation stop and at least one connecting segment with a curved face.

15. A torsion axle comprising:
  an axle tube having an interior chamber; and
  an insert assembly positioned in said interior chamber, wherein said insert assembly comprises,
    a substantially rigid shaft having a front tip and a rear tip,
    a relatively flexible cartridge having an interior passageway receiving said shaft, and
    means positioned on said shaft between said front tip and said cartridge and between said rear tip and said cartridge for substantially absorbing a vertical load on said insert assembly to the exclusion of said cartridge.

16. The torsion axle of claim 15, wherein said insert assembly further comprises means positioned around said shaft for limiting rotation of said shaft relative to said axle tube.

17. A torsion axle comprising:
  an axle tube having an interior chamber; and
  an insert assembly positioned within said interior chamber, wherein said insert assembly comprises,
    a substantially rigid shaft having a front tip and a rear tip,
    a relatively flexible cartridge having an interior passageway receiving said shaft, and
    means positioned around said shaft for limiting rotation of said shaft relative to said axle tube.

18. The torsion axle of claim 17, wherein said rotation limiting means is a disk having an irregularly shaped outside edge.

19. The torsion axle of claim 18, wherein said outside edge has at least one corner with a trailing and leading face forming a rotation stop and at least one connecting segment with a curved face.

20. A torsion axle comprising:
  an axle tube having an interior chamber;
  an insert assembly positioned within said interior chamber, wherein said insert assembly comprises,
    a substantially rigid shaft having a front tip and a rear tip, and
    a relatively flexible cartridge having an interior passageway receiving said shaft; and
  a cap positioned over said interior chamber, wherein said cap has a selectively removable retention means to enable selective removal of said cap from over said interior chamber and selective removal of said insert assembly from within said interior chamber.

21. The torsion axle of claim 20, wherein said cap has a face positioned over said interior chamber and sides oriented substantially perpendicular to said face, said sides overlapping said axle tube.

22. A method for selectively adjusting the torsion load rating of a torsion axle, wherein said torsion axle has an axle tube with an interior chamber, said method comprising:

removing a first insert assembly from said interior chamber, wherein said first insert assembly comprises,
  a substantially rigid first shaft having a fixed length and having a front tip and a rear tip;
  a relatively flexible first cartridge having a first length and having an interior passageway receiving said first shaft,
  a relatively inflexible first front bushing having an aperture receiving said first shaft, wherein said first front bushing is positioned on said first shaft between said front tip and said first cartridge, and
  a relatively inflexible first rear bushing having an aperture receiving said first shaft, wherein said first rear bushing is positioned on said first shaft between said rear tip and said first cartridge; and
positioning a second insert assembly in said interior chamber, wherein said second insert assembly comprises,
  a substantially rigid second shaft having said fixed length and having a front tip and a rear tip;
  a relatively flexible second cartridge having a second length different than said first length and having an interior passageway receiving said second shaft,
  a relatively inflexible second front bushing having an aperture receiving said second shaft, wherein said second front bushing is positioned on said second shaft between said front tip and said second cartridge, and
  a relatively inflexible second rear bushing having an aperture receiving said second shaft, wherein said second rear bushing is positioned on said second shaft between said rear tip and said second cartridge.

23. The method of claim 22, wherein said first insert assembly has a higher the torsion load rating than said second insert assembly.

24. The method of claim 23, wherein said first length is longer than said second length.

25. The method of claim 22, wherein said second insert assembly has a higher the torsion load rating than said first insert assembly.

26. The method of claim 25, wherein said second length is longer than said first length.

* * * * *